(12) United States Patent
Abe et al.

(10) Patent No.: US 10,695,965 B2
(45) Date of Patent: Jun. 30, 2020

(54) INJECTION MOLDED BODY, INJECTION MOLDING METHOD, AND INJECTION MOLDING DIE

(71) Applicant: NTN CORPORATION, Osaka (JP)

(72) Inventors: Hirohisa Abe, Mie (JP); Satoru Fukuzawa, Mie (JP)

(73) Assignee: NTN CORPORATION, Osaka (JP)

( * ) Notice: Subject to any disclaimer, the term of this patent is extended or adjusted under 35 U.S.C. 154(b) by 551 days.

(21) Appl. No.: 14/909,076

(22) PCT Filed: Jul. 28, 2014

(86) PCT No.: PCT/JP2014/069825
§ 371 (c)(1),
(2) Date: Jan. 29, 2016

(87) PCT Pub. No.: WO2015/016179
PCT Pub. Date: Feb. 5, 2015

(65) Prior Publication Data
US 2016/0158982 A1 Jun. 9, 2016

(30) Foreign Application Priority Data

Jul. 30, 2013 (JP) .................. 2013-157552

(51) Int. Cl.
*B29C 45/38* (2006.01)
*B29C 45/27* (2006.01)
*C08J 5/00* (2006.01)

(52) U.S. Cl.
CPC .......... *B29C 45/38* (2013.01); *B29C 45/2708* (2013.01); *C08J 5/00* (2013.01); *C08J 2327/18* (2013.01); *C08J 2329/10* (2013.01)

(58) Field of Classification Search
CPC ...... C08J 5/00; C08J 2327/18; C08J 2329/10; B29C 45/38; B29C 45/2708
See application file for complete search history.

(56) References Cited

U.S. PATENT DOCUMENTS

2011/0042854 A1* 2/2011 Abe .................. B29C 45/0025
264/328.1

FOREIGN PATENT DOCUMENTS

JP  02-281917 A  11/1990
JP  09-315615 A  12/1997
(Continued)

OTHER PUBLICATIONS

English machine translation of Abe, Hirohisa; JP 2003-231157 A; orginally published Aug. 19, 2003; obtained Jan. 23, 2018 from Espacenet.*

(Continued)

*Primary Examiner* — Michael M. Robinson
(74) *Attorney, Agent, or Firm* — Hedman & Costigan, P.C.; James V. Costigan; Kathleen A. Costigan

(57) ABSTRACT

A method for making a synthetic resin injection molded body that is gate-cut by die opening after injection molding by means of a pinpoint gate 9. A cavity 10 is filled with a molten resin, from a first sprue 6 that is provided coaxially with the injection direction of the molten resin, through a runner 7 that is provided in the perpendicular direction to the first sprue 6, via a pinpoint gate 9 that is formed on a tip part of a second sprue 8 that is provided horizontally to the injection direction of the molten resin, from a gate port 9a of the pinpoint gate 9 formed on a cavity plane that is in parallel with the die opening direction; after cooling, gate cutting is performed by means of die opening; and a molded body is taken out in an ejection step.

3 Claims, 8 Drawing Sheets

(56) References Cited

FOREIGN PATENT DOCUMENTS

| JP | 10-024455 A | 1/1998 |
| JP | 10-254199 A | 9/1998 |
| JP | 2003-231157 A | 8/2003 |
| JP | 2006-347032 A | 12/2006 |
| JP | 2009-133473 A | 6/2009 |
| JP | 2010-046910 A | 3/2010 |
| JP | 2010-052940 A | 3/2010 |
| JP | 2013-067177 A | 4/2013 |
| JP | 2013-075504 A | 4/2013 |

OTHER PUBLICATIONS

Machine translation obtained Jan. 23, 2018 of Abe, Hirohisa; JP-2003231157-A; published Aug. 2003; (Year: 2003).*
Wen He et al., Interpretation of the examples of injection molding die designing, Liaoning Science & Technology Publishing House, Oct. 31, 2009, pp. 133-136.
Guo Xinling et al., Design and fabrication of plastic mold, China Machine Press, Sep. 30, 2012, pp. 108-109.
English translation of Wen He et al., Interpretation of the examples of injection molding die designing, Liaoning Science & Technology Publishing House, Oct. 31, 2009, pp. 133-136.
English translation of Guo Xinling et al., Design and fabrication of plastic mold, China Machine Press, Sep. 30, 2012, pp. 108-109.
International Search Report dated Oct. 21, 2014.
English Abstract for JP 2009-133473 A dated Jun. 18, 2009.
English Abstract for JP 2010-052940 A dated Mar. 11, 2010.
English Abstract for JP 2013-067177 A dated Apr. 18, 2013.
English Abstract for JP 2013-075504 A dated Apr. 25, 2013.

* cited by examiner (a)

(b)

(a)

(b)

(a)

(b)

INJECTION MOLDED BODY, INJECTION MOLDING METHOD, AND INJECTION MOLDING DIE

TECHNICAL FIELD

The present invention relates to an injection molding method, an injection molding die and an injection molded body that are suitable in the cases when a sliding synthetic resin having a high tensile elongation rate is used. Specifically, the present invention relates to a guide part formed of an injection molded body in an electrophotographic device.

BACKGROUND ART

In electrophotographic devices such as copying machines and laser beam printers, since a toner is melted by heat and then fixed on a sheet, fixing is performed on a fixing part by applying high heat of around 200° C. Thereafter, the sheet is ejected by a paper injection roller and a paper injection guide (a paper injection rib). However, in accordance with the speeding-up in recent years, sheets and fixed toners are passed through paper injection parts while still being in a high temperature state. Therefore, toners are often brought into contact with paper injection rollers and the like in a semi-molten state in many cases, and heat-resistance and non-tackiness to toners have been required for paper injection rollers.

Fluorine resin products, which are excellent in non-tackiness, have been conventionally used for guide parts used for these paper injection rollers, paper injection guides and the like. It is known that such fluorine resin products are produced by injection molding by using, for example, a molten fluorine resin having a crystalline melting point of 250° C. or more and a viscosity at a melting point of 280 to 380° C. in the range of $1\times10^3$ to $1\times10^6$ poise (see Patent Documents 1 and 2).

The above-mentioned molten fluorine resin has a large tensile elongation at break. Therefore, even after molding and cooling to around ordinary temperature, when the die is subjected to die opening so that an injection molded body is separated from a gate, the resin in the gate and the resin that forms the molded body are separated from each other in the state that they have not been completely cut, and thus "stringing phenomenon" in which the resin is stretched like a string.

In a known injection molding method, in order to prevent such "stringing phenomenon", when a resin molded body with a hole is produced by injection molding, in-mold processing is performed by providing a core pin so that the core pin can be freely moved forward and backward in the axis direction in a cavity and providing a gate part on the extension of the center axis of the core pin, so that a gate is occluded by the tip of the core pin to thereby completely cut the resin in the gate and the molded body during the formation of a through hole on the molded body by means of the driven core pin (see Patent Document 3). In addition, as an injection molding die for a rolling element for transporting sheets in an image forming device, an injection molding die to which a pinpoint gate is adopted is known (see Patent Document 4).

PRIOR ART DOCUMENT

Patent Documents

Patent Document 1: JP 09-315615 A
Patent Document 2: JP 10-254199 A
Patent Document 3: JP 10-024455 A
Patent Document 4: JP 2003-231157 A

SUMMARY OF THE INVENTION

Problems to be Solved by the Invention

Even in the case when a pinpoint gate or a tunnel gate capable of being gate-cut in a die is adopted, "stringing phenomenon" may occur depending on the gate position and the like. Therefore, even in the case when a pinpoint gate or a tunnel gate is used to produce an injection molding die for the purpose of omitting a gate-cut processing in a post-step, a gate processing in the post-step cannot be omitted, and thus using an expensive specification of a die such as a pinpoint gate or a tunnel gate may become meaningless.

In the case when the tensile elongation at break of a synthetic resin is 100% or more, a stringing phenomenon easily occurs. For example, when a synthetic resin having a tensile elongation at break of 200% or more, such as a tetrafluoroethylene-perfluoroalkyl vinyl ether copolymer (hereinafter referred to as "PFA"), a tetrafluoroethylene-ethylene copolymer (hereinafter referred to as "ETFE") and a tetrafluoroethylene-hexafluoropropylene copolymer (hereinafter described as "FEP"), is used, the stringing phenomenon may not be solved by a conventional injection molding method as in Patent Document 4.

Furthermore, since a boring processing is performed simultaneously with gate cutting in a die in the injection molding method of Patent Document 3, the method cannot be applied to a molded body having no through hole.

The present invention has been made so as to address such problem, and aims at providing an injection molding method, which can solve a stringing phenomenon even in the case when a resin having a tensile elongation at break of 100% or more, where a stringing phenomenon easily occurs, is to be molded, and which can also be applied to a molded body having no through hole; an injection molding die used therefore; and an injection molded body obtained by the injection molding.

Means for Solving the Problem

The injection molded body of the present invention is a synthetic resin injection molded body that has been gate-cut by means of die opening after injection molding by means of a pinpoint gate. This injection molded body has a gate mark on a perpendicular plane in the axis direction of the molded body, which is a plane of the molded body in parallel with the die opening direction. Specifically, the injection molded body is a guide part for an electrophotographic device.

The above-mentioned synthetic resin is a synthetic resin having a tensile elongation at break of 100% or more, and is specifically at least one synthetic resin selected from PFA, ETFE and FEP.

The injection molding method of the present invention is a method for injection molding of a synthetic resin injection molded body that is gate-cut by means of die opening after injection molding by means of a pinpoint gate. In this method, a cavity is filled with a molten resin, from a first sprue that is provided coaxially with the injection direction of the molten resin, through a runner that is provided in the perpendicular direction to the first sprue, via a pinpoint gate that is formed on a tip part of a second sprue that is provided horizontally to the injection direction of the molten resin, from a gate port of the pinpoint gate, the gate port being formed on a cavity plane that is in parallel with the die opening direction; after cooling, gate cutting is performed by means of die opening; and an injection molded body in the cavity is taken out in an ejection step.

The injection molding die of the present invention is an injection molding die for use in the injection molding of a synthetic resin injection molded body that is gate-cut by means of die opening after injection molding by means of a pinpoint gate. This injection molding die is a three-plate die including a fixed head die plate, a fixed retainer plate and a movable retainer plate. The fixed head die plate has a first sprue that is provided coaxially to the injection direction of the molten resin, and has a runner between the fixed head die plate and the fixed retainer plate, the runner communicating with the first sprue and being provided in the direction perpendicular to the first sprue, the fixed retainer plate has a second sprue that communicates with the runner and is provided horizontally to the injection direction of the molten resin, the movable retainer plate has a cavity that communicates with a pinpoint gate molded on the tip part of the second sprue, and the cavity communicates with the pinpoint gate at a gate port that is molded on a cavity plane that is in parallel with the die opening direction.

Effect of the Invention

The injection molded body of the present invention is a synthetic resin injection molded body that has been gate-cut by means of die opening after injection molding by means of a pinpoint gate. This injection molded body has a gate mark on a perpendicular plane in the axis direction of the molded body, which is a plane of the molded body in parallel with the die opening direction. Therefore, even in the case when a synthetic resin having a tensile elongation at break of 100% of or more, in which a stringing phenomenon easily occurs, is used, the resin in the gate and the molded body can be surely cut, and thus an injection molded body in which a stringing phenomenon has been solved can be provided. Therefore, an injection molded body for which a gate processing is unnecessary in a step after molding, which has a high quality, and for which a production cost is suppressed can be provided. Consequently, the injection molded body of the present invention is preferable for a slide-contact guide for transporting sheets and a rolling element for transporting sheets, which are guide parts for an electrophotographic device.

Furthermore, even in the case when a synthetic resin having a tensile elongation at break of more than 200% such as PFA, ETFE or FEP is used, an injection molded body in which a stringing phenomenon has been solved can be provided.

The injection molding method of the present invention is a method for injection molding of a synthetic resin injection molded body that is gate-cut by means of die opening after injection molding by means of a pinpoint gate. In this method, a cavity is filled with a molten resin, from a first sprue that is provided coaxially with the injection direction of the molten resin, through a runner that is provided in the perpendicular direction to the first sprue, via a pinpoint gate that is formed on a tip part of a second sprue that is provided horizontally to the injection direction of the molten resin, from a gate port of the pinpoint gate, the gate port being formed on a cavity plane that is in parallel with the die opening direction; after cooling, gate cutting is performed by means of die opening; and an injection molded body in the cavity is taken out in an ejection step. Therefore, when a resin having a tensile elongation at break of 100% or more, in which a stringing phenomenon easily occurs, is molded, the resin in the gate and the molded body can be surely cut, whereby a stringing phenomenon can be solved. Furthermore, the method has a gate-cut property applicable to a molded body having no through hole.

Specifically, the injection molding method can be an injection molding method in which a stringing phenomenon does not occur, even in the case when a synthetic resin having a tensile elongation at break of more than 200% such as PFA, ETFE or FEP, in which a stringing phenomenon occurs in a general pinpoint gate, is used. Therefore, it is unnecessary to treat burrs that remain on a gate part by a post-processing.

The injection molding die of the present invention is an injection molding die for use in the injection molding of a synthetic resin injection molded body that is gate-cut by means of die opening after injection molding by means of a pinpoint gate. This injection molding die is a three-plate die including a fixed head die plate, a fixed retainer plate and a movable retainer plate. The fixed head die plate has a first sprue that is provided coaxially to the injection direction of the molten resin, and has a runner between the fixed head die plate and the fixed retainer plate, the runner communicating with the first sprue and being provided in the direction perpendicular to the first sprue, the fixed retainer plate has a second sprue that communicates with the runner and is provided horizontally to the injection direction of the molten resin, the movable retainer plate has a cavity that communicates with a pinpoint gate formed on a tip part of the second sprue, and the cavity communicates with the pinpoint gate at a gate port that is formed on a cavity plane that is in parallel with the die opening direction. The molded body molded by this injection molding die can surely cut the resin in the gate and the molded body to thereby solve a stringing phenomenon even in the case when this is a molded body of a resin having a tensile elongation at break of 100% or more, in which a stringing phenomenon easily occurs. Furthermore, the injection molding die has a gate cut property applicable to a molded body having no through hole.

MODE FOR CARRYING OUT THE INVENTION

Figure 1:
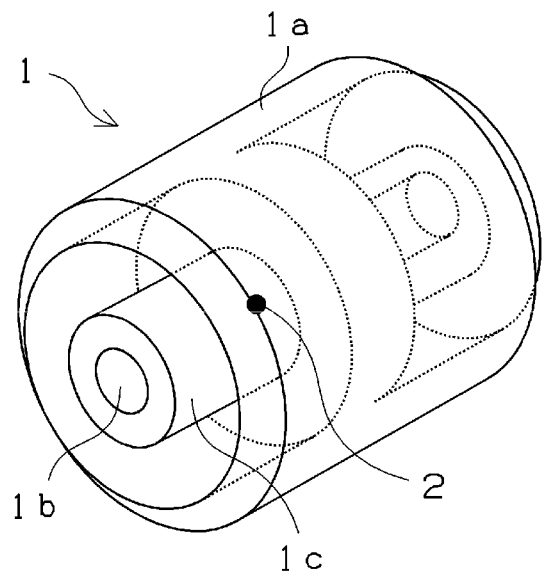
FIGS. 1(a) and 1(b) are a perspective view and a frontal cross-sectional view, respectively, showing a paper injection roller, which is a guide part for an electrophotographic device, as an example of the injection molded body of the present invention.
Figure 1:
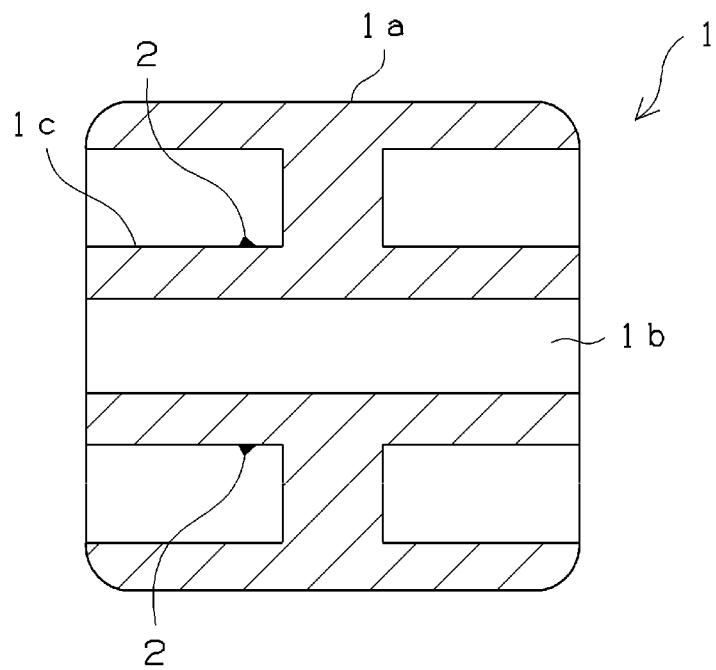

The injection molded body of the present invention is preferable for a guide part for an electrophotographic device.

Examples of this guide part include slide-contact guides for transporting sheets such as a paper injection guide and a flipper rib, or rolling elements for transporting sheets such as a paper injection roller, an intermediate guide roller and a kick-out roller.

A paper injection roller, which is an example of the injection molded body of the present invention, and is a guide member for an electrophotographic device, will be explained based on FIG. 1. FIG. 1(a) is a perspective view of the paper injection roller, and FIG. 1(b) is a frontal cross-sectional view of the paper injection roller. As shown in FIGS. 1(a) and 1(b), the paper injection roller 1 is an approximately-cylindrical molded body having a bearing hole 1b and a guide part 1a. The shape of the guide part 1a can be in parallel with the axis center, or a convex crowning shape or the like. The paper injection roller 1 is a synthetic resin injection molded body that has been gate-cut by a pinpoint gate by die opening after injection molding, and has a gate mark 2 on a perpendicular plane 1c in the axis direction, which is the surface of the molded body in parallel with the die opening direction. This injection molded body (the paper injection roller 1) is gate-cut during die opening by using a pinpoint gate in a three-plate mold, and is not gate-cut during the ejection of the molded body. Furthermore, the molded body does not include a molded body molded by using a tunnel gate as in FIG. 8.

The perpendicular plane 1c is the outer diameter plane of the bearing part (central cylinder part) that constitutes the bearing hole 1b. The perpendicular plane 1c may be not completely in parallel with the die opening direction and may be an approximately parallel plane having a slight inclination angle (an approximately perpendicular plane in the axis direction), as long as the perpendicular plane 1c is within a scope in which a stringing phenomenon can be prevented in the gate cutting by die opening during the injection molding mentioned below. Specifically, the perpendicular plane may be inclined by about 0° to 5° with respect to the die opening direction (axis direction).

As the synthetic resin to be an injection molding material, a synthetic resin having a tensile elongation at break of 100% or more is adopted, and a stringing phenomenon can be prevented in the present invention in well-known resins having such property. Examples of this synthetic resin include molten fluorine resins such as PFA, ETFE and FEP, thermoplastic elastomers such as urethane elastomers, polyester elastomers, polyamide elastomers, vinyl chloride elastomers and polybutadiene elastomers, polyurethane resins, polyamide resins, polyethylene resins, polypropylene resins, polyacetal resins, and the like. Specifically, in the case when the injection molded body is a guide part for an electrophotographic device, PFA ETFE, FEP and the like are preferable since these are excellent in non-tackiness with toners. Although PFA, ETFE and FEP have a tensile elongation at break of 200% or more, even in the cases when these are used, a stringing phenomenon can be significantly prevented. The "tensile elongation at break" in the present invention is a ratio (%) of a length when a test piece is broken by a tensile load to a length of an unloaded (a tensile load is not applied) test piece (a length in a tensile direction), and is obtained by the test method defined by D638 in ASTM.

The above-mentioned synthetic resin can contain fibrous reinforcing agents, other well-known filler materials and additives. In the case when the injection molded body is a guide part for an electrophotographic device, in order to obtain a strength that is necessary and sufficient during paper injection, for example, carbon fibers, glass fibers, calcium silicate whiskers, calcium carbonate whiskers, calcium sulfate whiskers, magnesium sulfate whiskers, magnesium nitrate whiskers and the like can be incorporated.

The shape and size of the injection molded body of the present invention are not specifically limited, and the injection molded body is a resin product according to the purpose of use such as a sliding part or other resin product. Therefore, the injection molded body is not limited to a cylindrical shape as shown in FIG. 1, and may have no bearing hole but have an axis part. Furthermore, the injection molded body may also have a plate shape or other shapes. In addition, in the case of a guide part for an electrophotographic device as shown in FIG. 1, the axis direction length and guide part diameter thereof are each from several millimeters to several ten millimeters. In addition, in the case when the injection molded body is a guide part for an electrophotographic device, a gate is provided on the surface of a guide part in a manner that a gate mark is not provided. Furthermore, in the case when the injection molded body has a bearing hole 1b as in FIG. 1, a gate is provided on the surface of the bearing hole 1b in a manner that a gate mark is not provided.

The injection molding method for obtaining the injection molded body of the present invention basically includes a step of filling a cavity with a molten synthetic resin by injection from a gate into the cavity, a step of solidifying the injection-filled synthetic resin by cooling, a step of gate cutting by die opening of the die, and a step of demolding the molded body from the die by means of an ejection pin.

Figure 2:
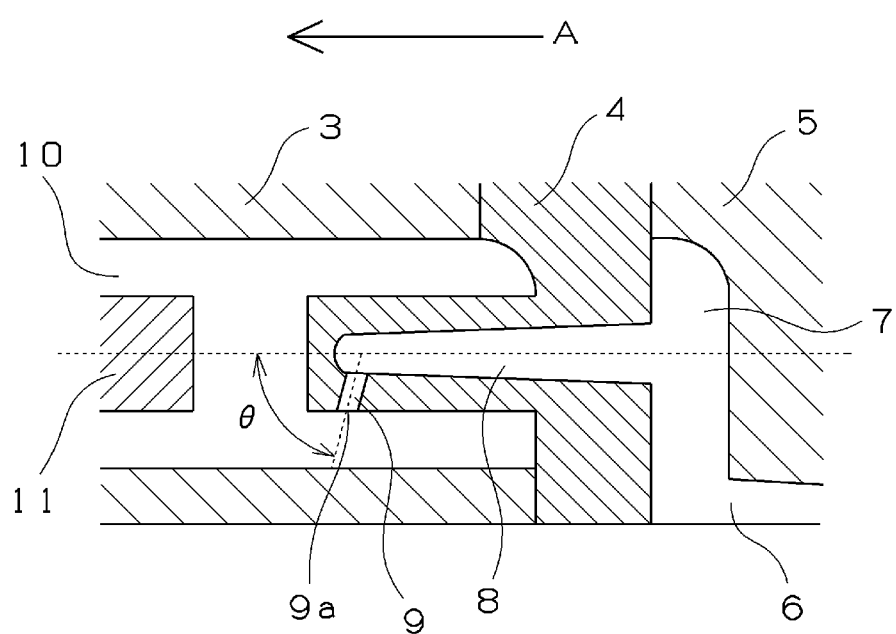
FIG. 2 is a cross-sectional view showing an example of the injection molding die of the present invention.
Figure 3:
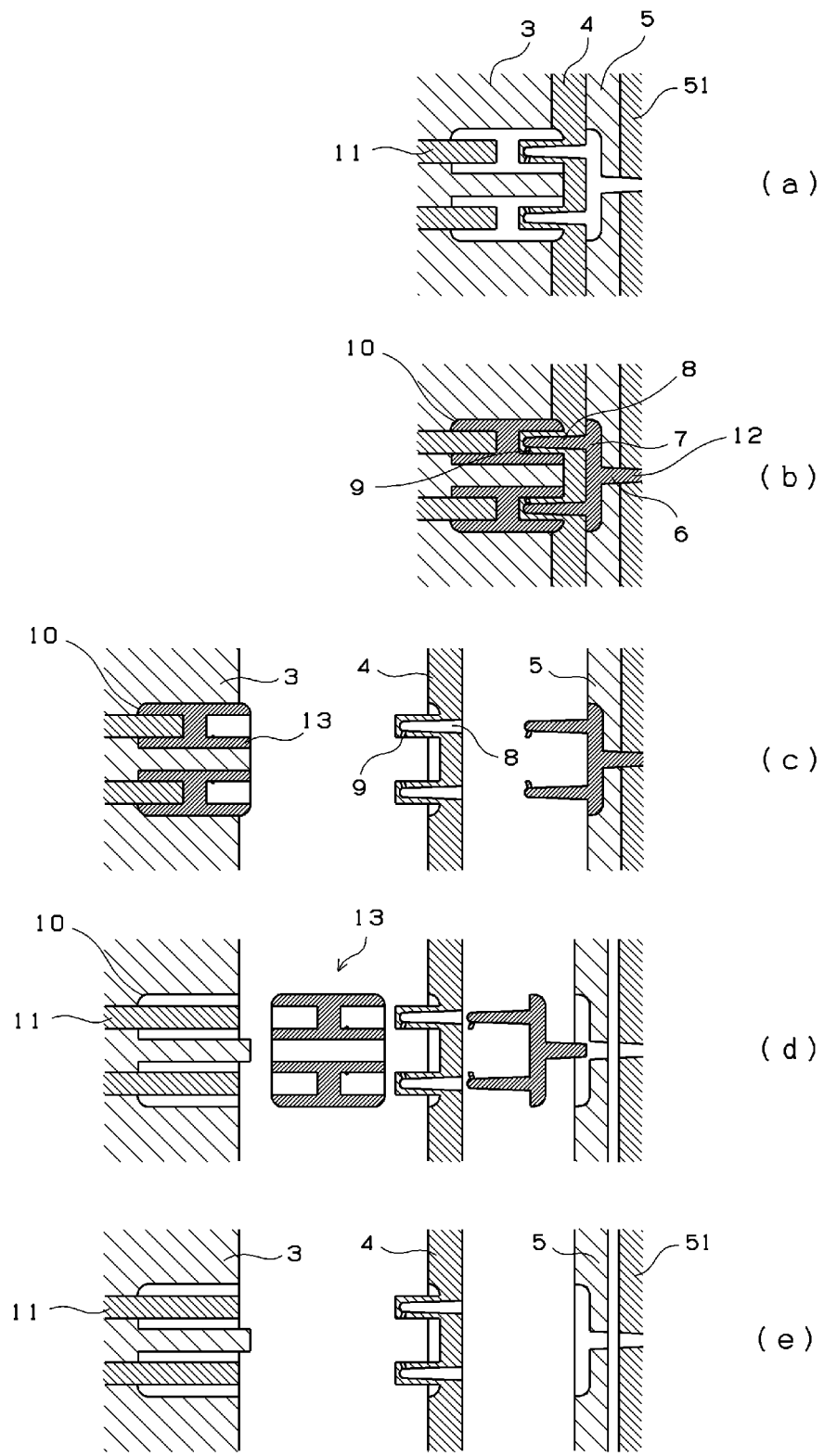
FIGS. 3(a) to 3(e) are drawings showing the steps of the injection molding method of the present invention.

The injection molding die of the present invention will be explained based on FIGS. 2 and 3. FIG. 2 is a cross-sectional view of an injection molding die for molding the injection molding die of FIG. 1. As shown in FIGS. 2 and 3, this injection molding die is a die having a three-plate structure constituted by a fixed head die plate 51 including a runner stripper plate 5, a fixed retainer plate 4 and a movable retainer plate 3. The injection direction of the molten resin and the die opening direction A of the die are in parallel. A first sprue 6 that is provided coaxially with the injection direction of the molten resin is provided to the fixed head die plate 51, a runner 7 that is provided in the perpendicular direction of the first sprue 6 in communication with the first sprue 6 is provided between the runner stripper plate 5 and the fixed retainer plate 4, and second sprue 8 that is provided horizontally to the injection direction of the molten resin in communication with the runner 7 is provided to the fixed retainer plate 4, respectively. A cavity 10 that is in communication with a pinpoint gate 9 that is formed on the tip part of the second sprue 8 is provided to the movable retainer plate 3. This cavity 10 is in communication with the pinpoint gate 9 at a gate port 9a that is formed on a cavity plane that is in parallel with the die opening direction A. By this structure, as mentioned below, a stringing phenomenon does not occur in in-mold gate cutting.

As shown in FIG. 2, (the shaft center of) the pinpoint gate 9 formed on the tip part of the second sprue 8 inclines by an angle θ with respect to the shaft center of the second sprue 8. Since the gate port 9a is formed on the cavity plane that is in parallel with the die opening direction A, and the second sprue 8 is approximately in parallel with the cavity plane, it is necessary to incline the pinpoint gate 9 that allows the cavity 10 and the second sprue 8 to communicate with each other, rather than to put the pinpoint gate 9 on the shaft center of the second sprue 8 in a conventional way (see FIG. 5). The inclination angle θ is 30° to 90°, more preferably 40° to 80°.

The injection molding method of the present invention will be explained based on FIG. 3. FIGS. 3(a) to 3(e) are drawings showing the steps of molding an injection molded body (a paper injection roller) by using the injection molding die of FIG. 2. This injection molding method is a method for producing the injection molded body of the present invention.

[FIG. 3(a)]

Firstly, in the injection molding die having a three-plate structure composed of a fixed head die plate 51 including a runner stripper plate 5, a fixed retainer plate 4, and a movable retainer plate 3, the temperature is controlled to be a predetermined temperature of a resin to be used, in a die-closing state. The detailed structure of the die is as shown in FIG. 2.

[FIG. 3(b)]

Secondly, when a synthetic resin 12 that has been heated to a molten state is injected into the die by a preset injection pressure from a nozzle tip, which is not illustrated, the cavity 10 is filled with the molten resin via a pinpoint gate 9 that is formed on a tip part of a second sprue 8 that is provided horizontally to the injection direction of the molten resin, from a first sprue 6 that is provided coaxially with the injection direction of the molten resin, through a runner 7 that is provided in the perpendicular direction to the first sprue 6. The gate port of the pinpoint gate 9 (see FIG. 2) is formed on a cavity plane that is in parallel with the die opening direction. Thereafter a pressure retention step and a cooling step go through for predetermined times in a die-closing state.

[FIG. 3(c)]

After the cooling step, the fixed retainer plate 4 is released from the runner stripper plate 5 by die opening, and the movable retainer plate 3 is simultaneously released from the fixed retainer plate 4. When the movable retainer plate 3 is released from the fixed retainer plate 4, the resin that is present in the pinpoint gate 9 formed on the tip part of the second sprue 8 is broken by being pulled, whereby gate cutting is performed. Since the gate port of the pinpoint gate 9 (see FIG. 2) is formed to be thinner than the tip of the second sprue 8, the gate port is the weakest in strength and thus is broken. At this time, since the gate port of the pinpoint gate 9 is formed on the cavity plane that is in parallel with the die opening direction, and the gate itself is formed in the range of an inclination angle of, for example, 30° to 90°, with respect to the shaft center of the second sprue 8, the gate cutting is performed without causing a stringing phenomenon. The runner and the like after this step are in a state that they are attached to the runner stripper plate 5, and an injection molded body 13 is in a state that it is retained in the cavity 10 of the movable retainer plate 3.

[FIG. 3(d)] [FIG. 3(e)]

Secondly, the runner and the like that are attached to the runner stripper plate 5 are released and then fall from the die, by the releasing of the runner stripper plate 5 from the fixed head die plate 51, and the injection molded body 13 is taken from the inside of the cavity 10 by allowing an ejection pin 11 of the movable retainer plate 3 to go forward. The ejection pin 11 is then pulled back in the axis direction, and returned to the position before the ejection. After the runner and the like and the injection molded body have been taken out of the die, the movable retainer plate 3 transfers to the direction of the fixed head die plate 51, and the three plates, the fixed head die plate 51 (including the runner stripper plate 5), the fixed retainer plate 4 and the movable retainer plate 3, return to the die-closing state (see FIG. 3(a)), and the next injection molding is initiated.

EXAMPLES

Example 1

A paper injection roller for an electrophotographic device, which is a synthetic resin injection molded body, was produced by means of the injection molding method of FIG. 3, by using the injection molding die of FIG. 2. The shape of this paper injection roller is the shape shown in FIG. 1, and the outer diameter is 10 mm, the inner diameter is 8 mm, the bearing hole diameter is 3 mm, the bearing part outer diameter is 5 mm, and the full length is 13 mm. Furthermore, the gate port diameter of the injection molding die is 0.8 mm, and the inclination angle θ with respect to the shaft center of the second sprue of the pinpoint gate is 45°. The synthetic resin used was PFA manufactured by NTN Precision Resins: BEAREE FE5000 (tensile elongation at break: 380%).

The paper injection roller produced under this condition had a gate mark as shown in FIG. 1, and the resin in the gate and the molded body were surely cut without a stringing phenomenon, although a molten fluorine resin having a tensile elongation at break of 200% or more, in which a stringing phenomenon easily occurs, was used.

Comparative Example 1

Figure 5:
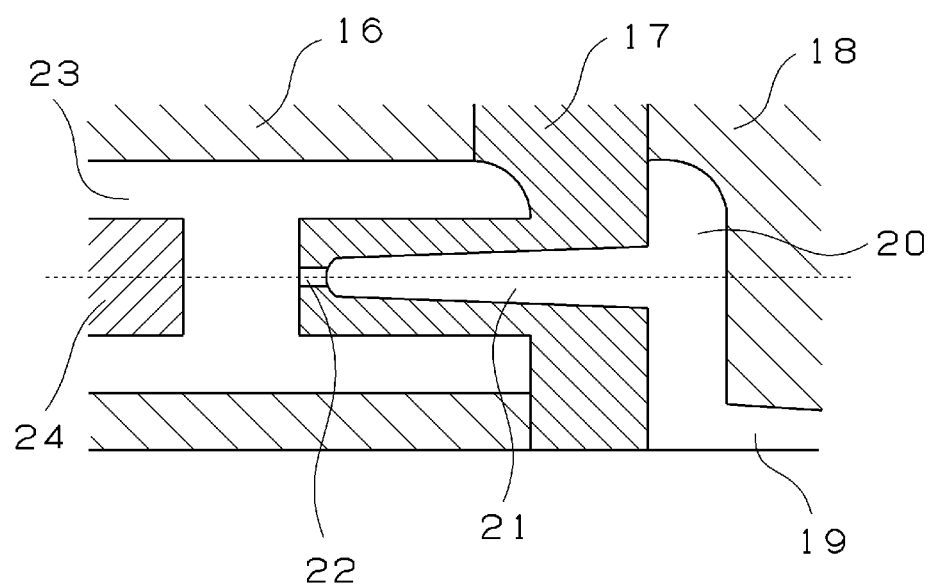
FIG. 5 is a cross-sectional view showing a conventional injection molding die.
Figure 6:
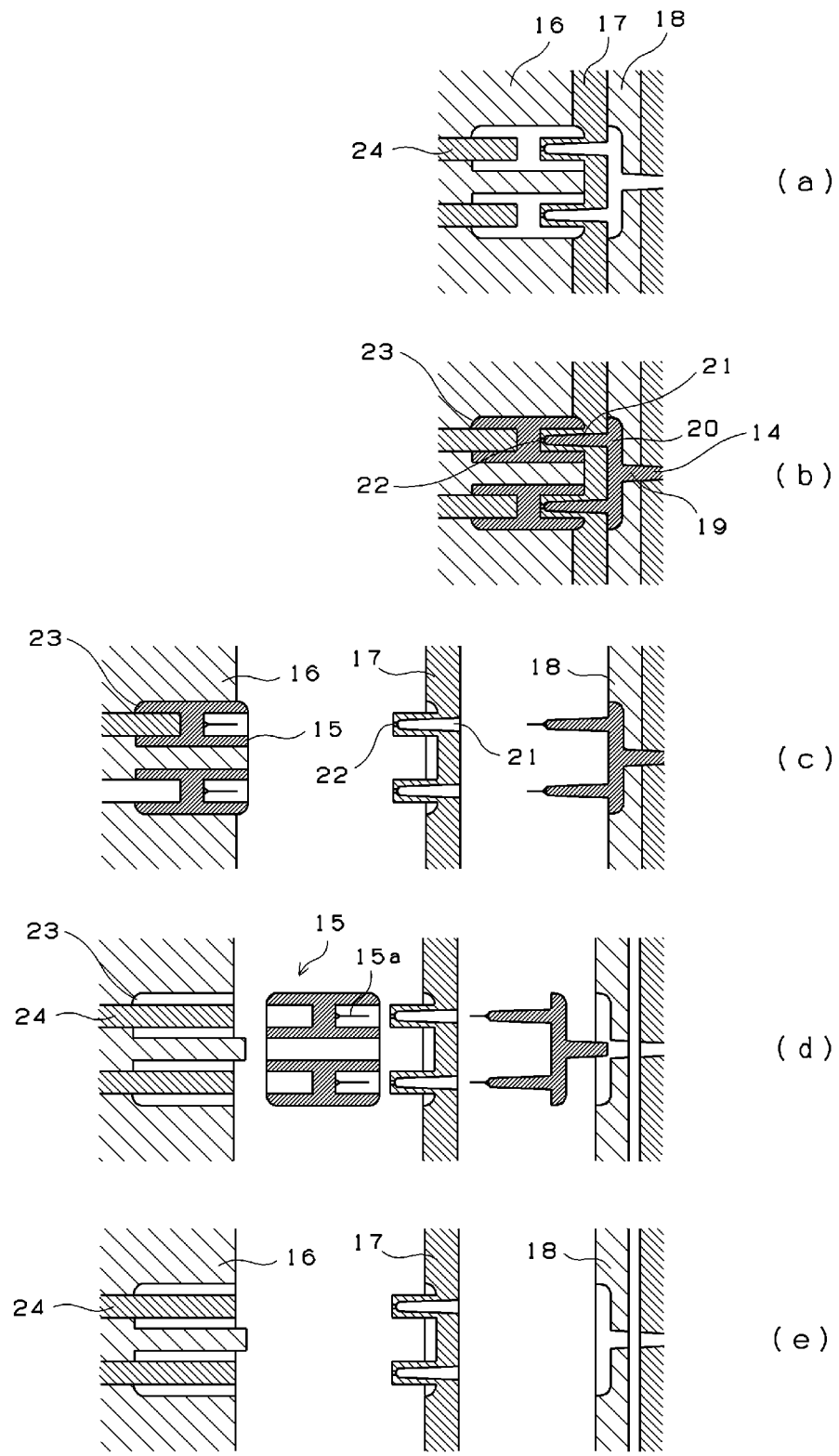
FIGS. 6(a) to 6(e) are drawings showing the steps of a conventional injection molding method.

A paper injection roller for an electrophotographic device, which is a synthetic resin injection molded body, was produced by means of the conventional injection molding method of FIG. 6, by using the conventional die shown in FIG. 5. The die shown in FIG. 5 is a die having a three-plate structure composed of a fixed die plate including the runner stripper plate 18, the fixed retainer plate 17, and the movable retainer plate 16, and is different from the die shown in FIG. 2 only in the embodiment of the pinpoint gate 22. That is, a first sprue 19 that is provided coaxially with the injection direction of the molten resin is provided to the fixed head die plate, a runner 20 that is provided in the perpendicular direction of the first sprue 19 in communication with the first sprue 19 is provided between the runner stripper plate 18 (the fixed head die plate) and the fixed retainer plate 17, a second sprue 21 that is provided horizontally to the injection direction of the molten resin in communication with the runner 20 is provided to the fixed retainer plate 17, and a cavity 23 that is in communication with the pinpoint gate 22 formed on the shaft center of the second sprue on the tip part of the second sprue 21 is provided to the movable retainer plate 16. A numeral 24 denotes an ejection pin. The steps for the injection molding are as shown in FIGS. 6(a) to 6(e), and are similar to the case of FIGS. 3(a) to 3(e) except for the embodiment of the pinpoint gate. Furthermore, the shape of the paper injection roller (except for the position of the gate mark) and the synthetic resin used were the same as those in Example 1.

Figure 4:
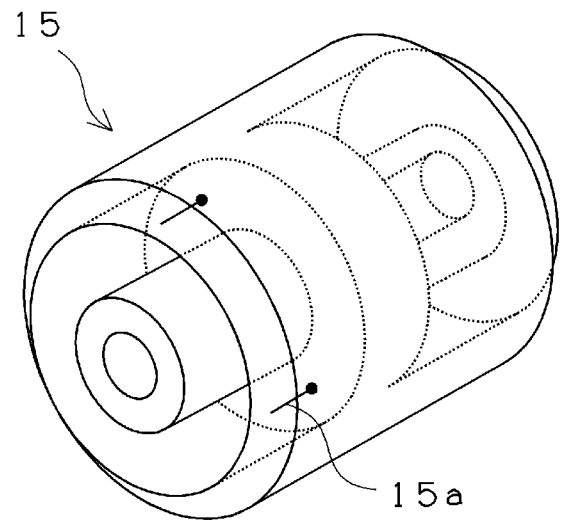
FIGS. 4(a) and 4(b) are a perspective view and a frontal cross-sectional view, respectively, showing a paper injection roller produced by a conventional method.
Figure 4:
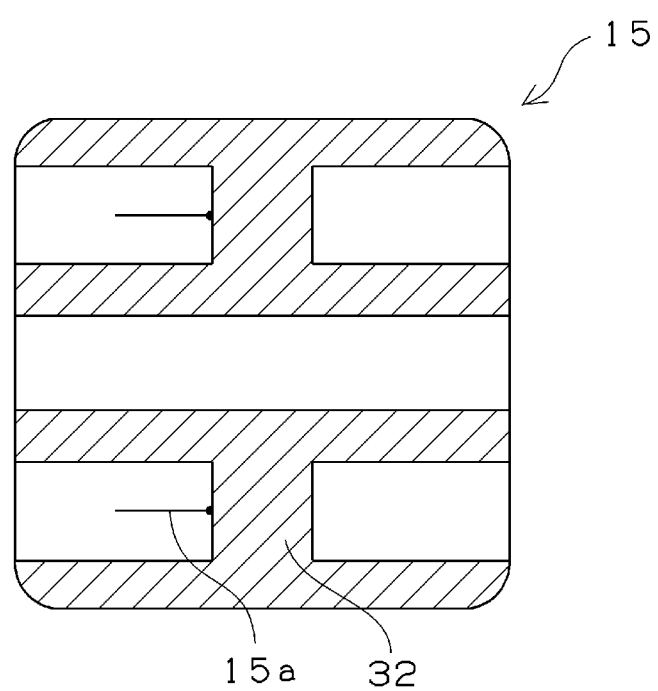

The paper injection roller produced under these conditions is shown in FIG. 4. FIG. 4(a) is a perspective view of this paper injection roller, and FIG. 4(b) is a frontal cross-sectional view of this paper injection roller. As shown in FIGS. 4(a) and 4(b), in the paper injection roller 15 produced under these conditions, a stringing phenomenon (the part of 15a) occurred in the gate cutting, and thus the appearance was poor. Furthermore, in the outer diameter surface of the molded paper injection roller, flow marks were generated on the outer periphery surface of the rib part 32.

Comparative Example 2

Figure 7:
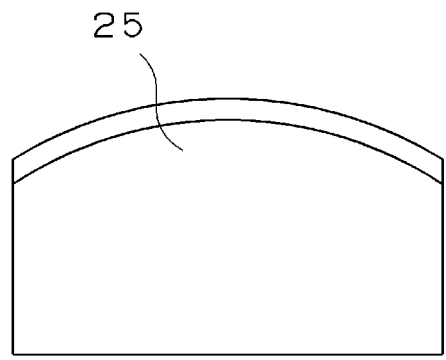
FIGS. 7(a) and 7(b) are an elevational view and a side view, respectively, of a conventional paper injection rib.
Figure 7:
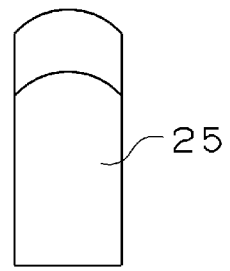
Figure 8:
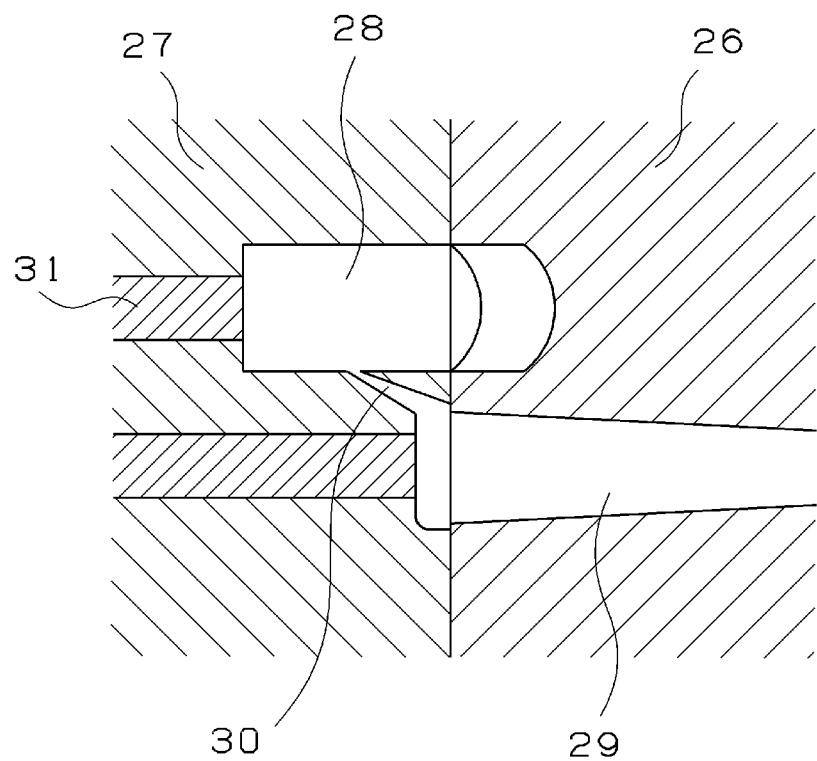
FIG. 8 is a cross-sectional view showing a conventional injection molding die (a tunnel gate is adopted).

A paper injection rib 25 having the shape shown in FIG. 7 was produced by means of the injection molding die of FIG. 8, in which the same resin material as in Example 1 was used, and to which a tunnel gate was adopted. FIG. 7(*a*) shows an elevational view of the paper injection rib, and FIG. 7(*b*) shows a side view of the paper injection rib. The die shown in FIG. 8 is a die having a two-plate structure composed of a movable retainer plate 27 and a fixed retainer plate 26. A cavity 28 is filled with the molten resin from a sprue 29 via a tunnel gate 30, and after a pressure retaining step and a cooling step, the die is opened, and a paper injection rib, which is an injection molded body, is taken from the inside of the cavity 28 by allowing an ejection pin 31 at the side of the movable retainer plate 27 to go forward. The gate cutting is conducted during the ejection of the paper injection rib.

In the paper injection rib produced under these conditions, a stringing phenomenon occurred in the gate cutting, and the appearance was poor.

INDUSTRIAL APPLICABILITY

Since the injection molding method of the present invention can solve a stringing phenomenon in the molding of a resin having a tensile elongation at break of 100% or more, at which a stringing phenomenon easily occurs, by surely cutting the resin in the gate and the molded body, and can also be applied to a molded body having no through hole, the injection molding method can be utilized for the production of various injection molded bodies. Specifically, the injection molding method can be preferably utilized for the production of guide parts for electrophotographic devices such as paper injection guides, flipper ribs, paper injection rollers, intermediate guide rollers and kick-out rollers, for which PFA, ETFE and FEP, which have a tensile elongation at break of 200% or more, are used as the materials therefor.

EXPLANATION OF REFERENCE SYMBOLS AND NUMERALS

1 Paper injection roller
2 Gate mark
3 Movable retainer plate
4 Fixed retainer plate
5 Runner stripper plate
51 Fixed head die plate
6 First sprue
7 Runner
8 Second sprue
9 Pinpoint gate
10 Cavity
11 Ejection pin
12, 14 Synthetic resin
13, 15 Injection molded body (paper injection roller)

The invention claimed is:

1. A synthetic resin injection molded body that has been gate-cut by means of die opening after injection molding by means of a pinpoint gate, wherein the synthetic resin is a synthetic resin having a tensile elongation at break of 100% or more, wherein the injection molded body is an approximately-cylindrical molded body having a bearing part that constitutes a bearing hole, and a guide part, the bearing part and the guide part being connected to each other at a central portion of the injection molded body in an axis direction, wherein the injection molded body has a gate mark, the gate mark being located on an outer diameter surface of the bearing part, which is a surface parallel to the axis direction of the molded body, and facing the inner surface of the guide part, wherein the gate mark does not have a resin string resulting from a stretch of the synthetic resin.

2. The injection molded body according to claim 1, wherein the injection molded body is a guide member for an electrophotographic device.

3. The injection molded body according to claim 1, wherein the synthetic resin is at least one synthetic resin selected from a tetrafluoroethylene-perfluoroalkyl vinyl ether copolymer, a tetrafluoroethylene-ethylene copolymer and a tetrafluoroethylene-hexafluoropropylene copolymer.

\* \* \* \* \*